Hammond & Reeves,
Truss Bridge.
No. 3292 Reissued Feb. 9. 1869.
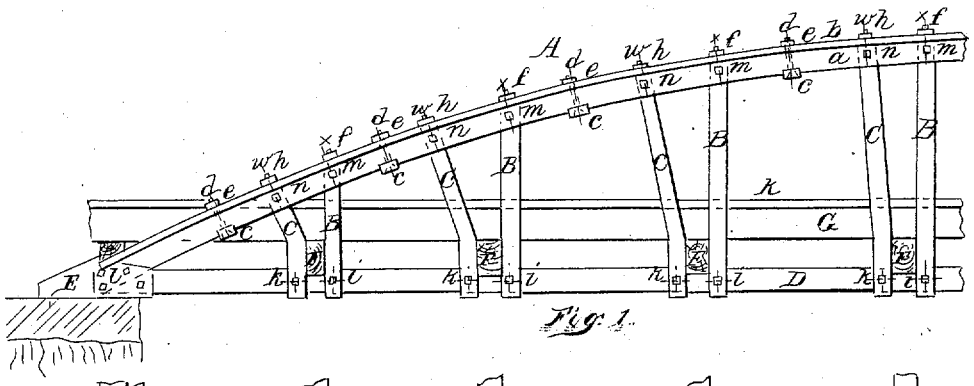
Fig. 1.
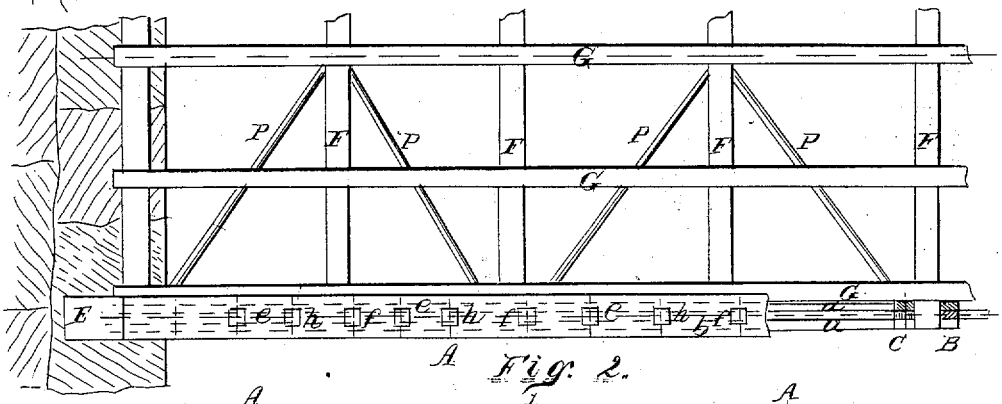
Fig. 2.
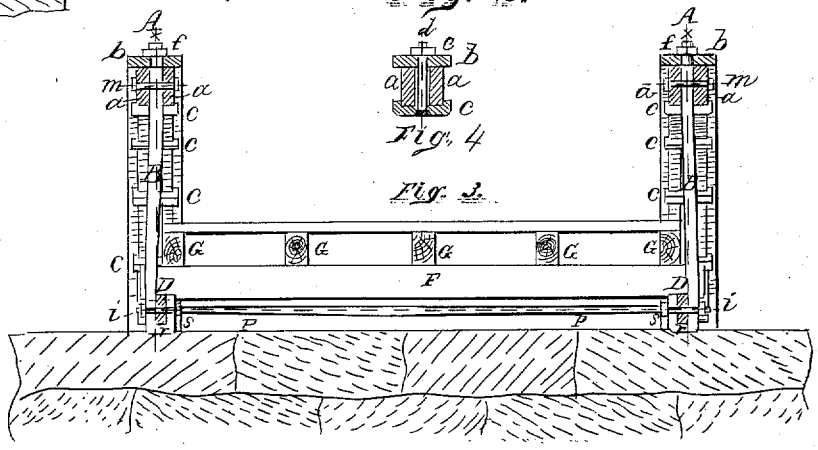
Fig. 4
Fig. 3.
Ed. A. Deebout
Rush K. Abbott } WITNESSES
David Hammond
W. R. Reeves } INVENTORS
BY Job Abbott ATTORNEY.
N. PETERS, PHOTO-LITHOGRAPHER, WASHINGTON, D. C.

UNITED STATES PATENT OFFICE.

DAVID HAMMOND AND W. R. REEVES, OF CANTON, OHIO.

IMPROVED IRON BRIDGE.

Specification forming part of Letters Patent No. 43,202, dated June 21, 1864; Reissue No. 2,701, dated July 30, 1867; Reissue No. 3,292, dated February 9, 1869.

*To all whom it may concern:*

Be it known that we, DAVID HAMMOND and W. R. REEVES, both of Canton, in the county of Stark and State of Ohio, have invented new and useful Improvements in Wrought-Iron Girders for Bridges or other structures; and we do hereby declare that the following is a full, clear, and exact description of our invention, reference being had to the accompanying drawings, forming a part of this specification, and to the letters of reference marked thereon, of which drawings—

Figure 1 is a side view of our girder applied to a bridge. Fig. 2 is a half-plan of the same. Fig. 3 is a cross-section of the same. Fig. 4 is a cross-section of the arch, showing its mode of construction.

The nature of our invention consists in the novel combination of the suspension-rods or diagonal braces with the arch-pieces and covering-piece of an arch of a bow-string girder, whereby we considerably increase the firmness of union between the arch-pieces and covering-piece and the strength of union between the arch and suspension-rods or diagonal braces.

Our invention further consists in the combination of an arch composed of two or more arch-pieces and a covering-piece, united by clamping-pieces and bolts, as is hereinafter more fully shown, with a chord or chords, suspension-rods, diagonal braces, and shoes, whereby we obtain a girder of great strength and rigidity with a moderate amount of material and cost of construction.

To enable others skilled in the art to make and use our invention, we will proceed to describe its construction and operation.

The arch A is composed of three strips of plate-iron, *a a b*, two plates, *a a*, being placed parallel to each other and in vertical positions, while the third plate, *b*, is laid on the top of these two plates in a horizontal position, and forms the covering-piece of the arch. The pieces are combined by means of the clamping-pieces *c c* (shown in detail in Fig. 4,) and the bolt *d*, which passes through the clamping-piece *c*, between the side plates *a a* of the arch, and through the covering-piece *b*, and is secured by the nut *e*, as shown. The string-piece D is a long piece of plate-iron set up edgewise, and forms the chord to the arch A. The ends of this string-piece D are placed between the ends of the arch-pieces *a a*, and they are set in shoes E, as shown. The shoes and ends of the string-piece and arch-pieces are firmly connected by bolts *l*, which pass through the sides of the shoe and the ends of the several pieces.

The suspension-rods B B are formed of rectangular or square iron, as shown, and are connected to the arch A by the bolts *m m*, which pass through the side pieces *a a* and a hole in the suspension-rod B, and also by a bolt, *x*, which is formed on the end of the suspension-rod B, as shown in Figs. 1 and 3, and which passes through the covering-piece *b*, and is secured by a nut, *f*, on the top of said plate.

It is readily seen that this method of connecting the suspension-rods and arch serves as an additional feature in combining the three plates *a a b* which form the arch A, and strengthens said arch against horizontal vibrations. The diagonal braces C C are combined with the arch A by bolts *n*, and bolt *w*, and nut *h*, in a manner precisely similar to that just described for combining the suspension-rods and arch. The suspension-rods B B and diagonal braces C C are connected to the string-piece D by means of the stirrups *r r*, formed on their lower ends, which support the chord D, as shown in Figs. 1 and 3, and are secured in the proper positions by bolts *k* and *i*, which pass through the two sides of the stirrups *r r* and the chord D, as shown. These bolts *k* and *i* may be simply bolts of ordinary form and proper length, or they may be formed by the ends of the horizontal braces *p p*, which are used to prevent a lateral vibration of the bridge, and which have a thread cut on their ends, and are provided with jam-nuts *s* and *j*, and pass through the stirrups *r r* and chord D, as shown in Fig. 3. The stringers F F are notched down onto the chords D D, between the suspension-rods B B and diagonal braces C C, as shown in Figs. 1, 2, and 3, and have the floor-stringers G G arranged on them, as shown. The flooring K is laid on these floor-stringers F F, as shown in Fig. 1.

Having thus fully described our girder, we do not claim as our invention the combination of the arch-pieces *a a*, covering-piece *b*, clamping-piece *c*, and bolt *d* with nut *e*, or the shoes E, chords D, suspension-rods B, braces C or *p*, or floor-beams G and F, as all these features have been before shown; but What we do claim as our invention, and desire to secure by Letters Patent, is—

1. The peculiar arrangement and combination of the arch-pieces *a a*, covering-piece *b*, bolt *m*, suspension-rod B, or diagonal brace C with bolt *x* or *w* and nuts *f* or *h*, the several parts being constructed and arranged substantially in the manner and for the purpose herein specified.

2. The combination of the arch A, composed of arch-pieces *a a*, covering-piece *b*, clamping-pieces *c c*, and bolts *d d* with nuts *e*, the chord D, suspension-rods B B, braces C C, and shoes E E, the whole forming a bow-string girder, substantially as and for the purpose specified.

As evidence that we claim the foregoing we have hereunto set our hands this 3d day of March, 1868.

DAVID HAMMOND.
W. R. REEVES.

Witnesses:
JOB ABBOTT,
ED. N. BEEBOUT.